United States Patent [19]
Vlahos

[11] 3,969,593
[45] July 13, 1976

[54] SOUND RECORDING ON COLOR FILM BY HUE MODULATION

[75] Inventor: Petro Vlahos, Tarzana, Calif.

[73] Assignee: The Association of Motion Picture and Television Producers Inc., Hollywood, Calif.

[22] Filed: Nov. 8, 1974

[21] Appl. No.: 522,233

[52] U.S. Cl. ............... 179/100.3 B; 179/100.3 GN
[51] Int. Cl.² ...................... G11B 7/00; G11B 7/24; G11B 23/18
[58] Field of Search ............. 179/100.3 K, 100.3 B, 179/100.3 C, 100.3 GN

[56] References Cited
UNITED STATES PATENTS

| | | | |
|---|---|---|---|
| 2,387,832 | 10/1945 | Cooney | 179/100.3 C |
| 3,281,151 | 10/1966 | Kaprelian et al. | 179/100.3 B |
| 3,624,284 | 11/1971 | Russell | 179/100.3 B |

*Primary Examiner*—Vincent P. Canney

[57] ABSTRACT

Sound is recorded on color motion picture film in the form of variations of hue rather than overall density, with inverse density variations of different color media of the film directly superposed. With three distinct color media it is possible in that manner to record two separate sound channels, the respective channels being hue modulated on distinct hue axes. Such hue modulated sound records are inherently virtually free from noise due to occlusions such as dirt and scratches on the film. Apparatus is disclosed for recording sound in the described manner and for reproducing sound from such records, including electronic means for reducing additional forms of noise. The inherent reduction of noise permits the normal sound track area of conventional films to accommodate several distinct tracks, each of which can carry two distinct sound channels or one sound channel and a control channel. Particularly effective and economical apparatus is described which can replace part of a conventional sound reproducing head and provide an existing motion picture projector with capability for reproducing such multi-track records.

34 Claims, 14 Drawing Figures

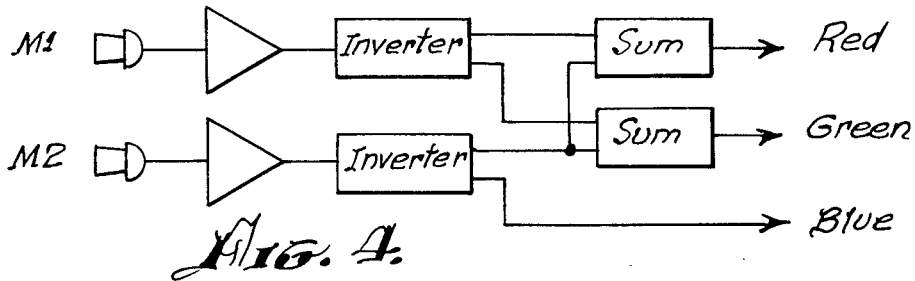
Fig. 4.
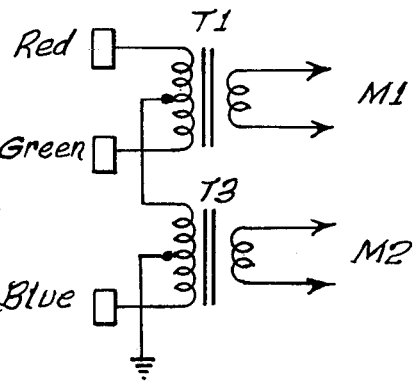
Fig. 5.
Fig. 6.
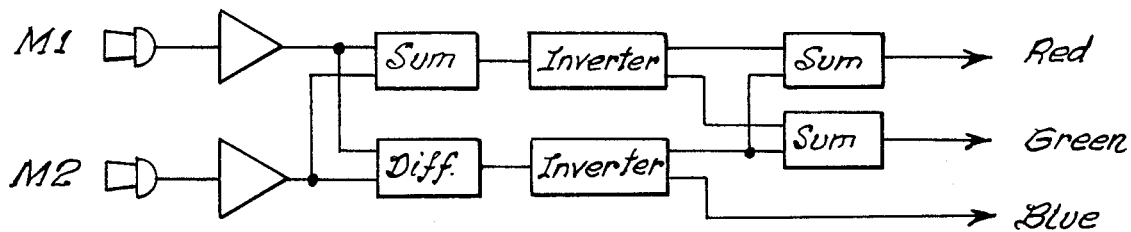
Fig. 7.
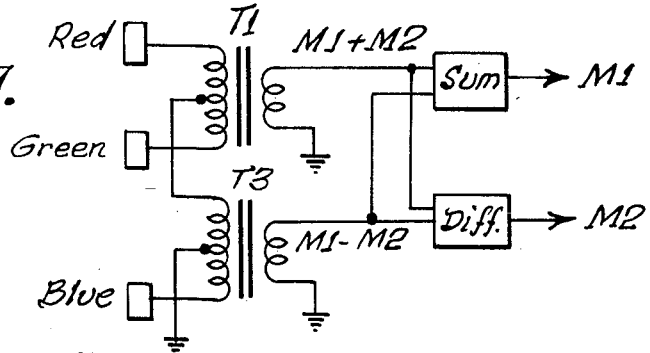
Fig. 9.
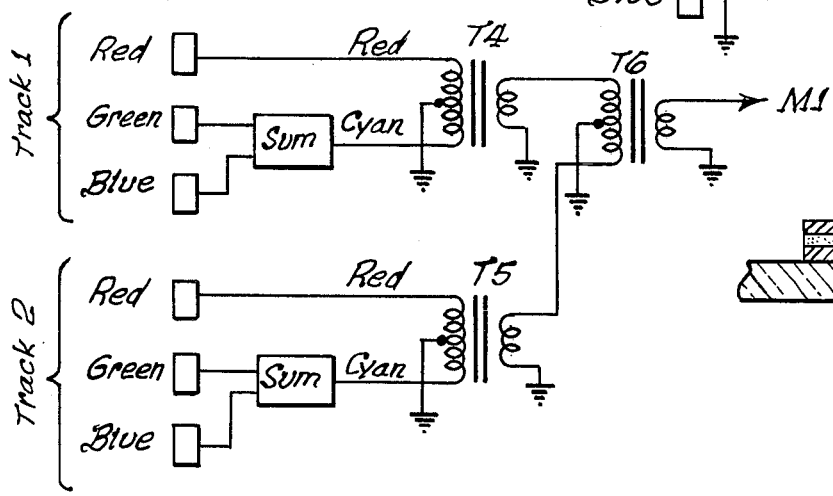
Fig. 8.

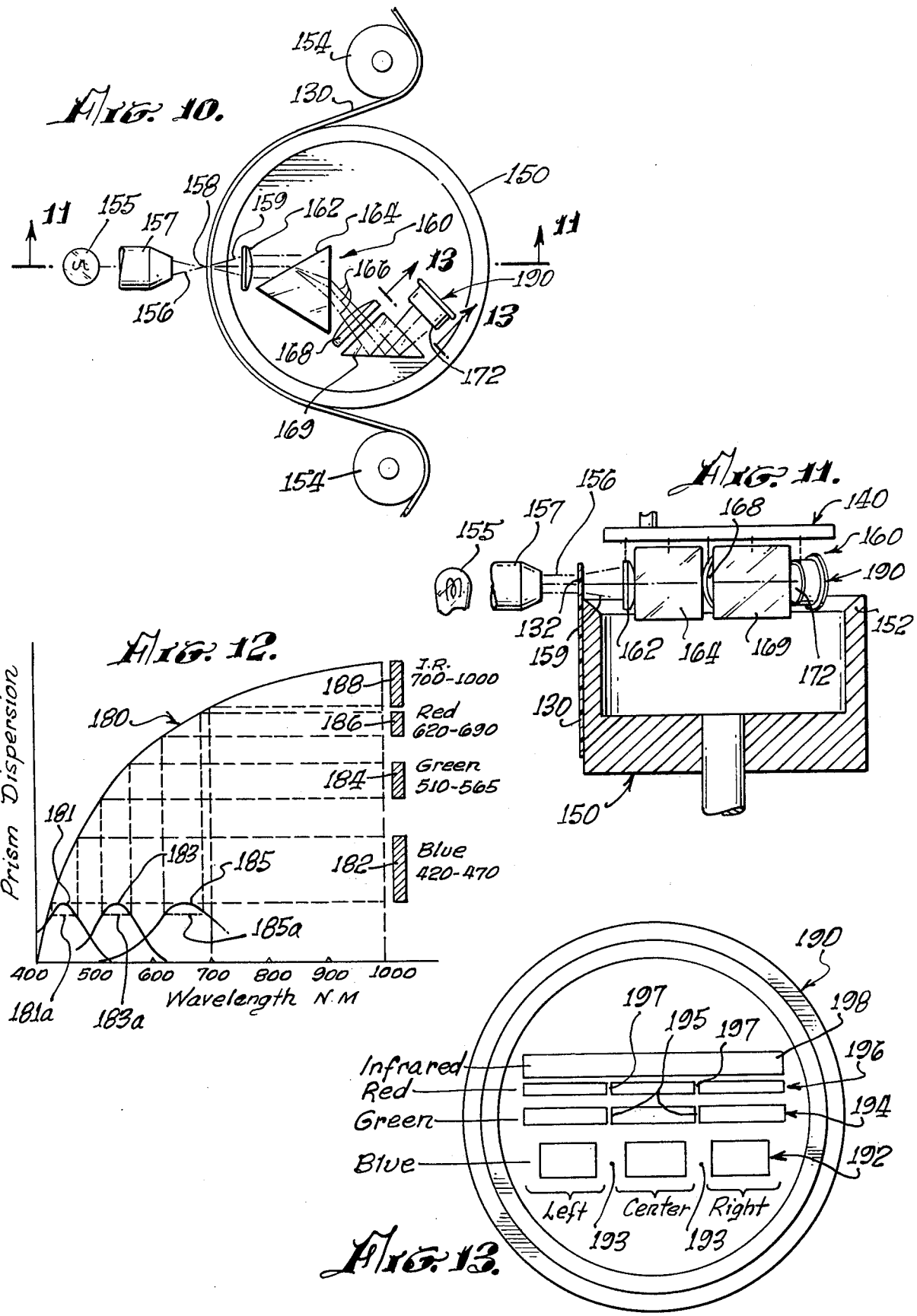

SOUND RECORDING ON COLOR FILM BY HUE MODULATION

FIELD OF THE INVENTION

This invention has to do generally with the optical recording of sound on motion picture film and the like, and with reproduction of the recorded sound.

More particularly, the invention concerns sound recording on color film carrying a plurality of distinct dyes or other media each of which absorbs light selectively in one spectral region while remaining essentially transparent to light in other regions. Such media may be formed all in one layer, as in the classical Technicolor process, or may be confined to respective, mutually superposed layers, as in the current Eastman Kodak Co. process using a color negative. A primary object of the invention is to utilize the selective light absorption of conventional color films for improving the quality and the versatility of optical sound recording.

Of major importance among the more specific objects of the invention is the production of optical sound tracks which are substantially immune to noise from dirt and scratches on the film.

A further object is to provide recorded sound that is essentially free from distortion due to nonlinearities during the recording process and that is relatively unaffected by laboratory processing variations.

The invention further aims to provide sound recording apparatus and technique which permits a plurality of sound channels to be recorded in the sound track area that is conventionally available on 35 mm color films, with corresponding extension of the presently available channels on films of other sizes and special types. Such additional channels are useful for many purposes, such as providing stereophonic sound, utilizing surround speakers in the theater, and recording control signals which may, for example, vary the degree of sound amplification, control the utilization of extra speakers and produce other special effects.

A further aim of the invention is to avoid any significant increase in costs for production, both of the improved original sound record and of release prints.

A further aspect of the invention aims to provide conversion equipment for theaters at moderate expense to enable them to play the improved sound track with some or all of the above described advantages. Moreover, the color sound track itself and the reproduction equipment are preferably so coordinated with each other and with present day conventional practice as to provide optimum compatibility. That is, theaters equipped to play the new track should continue to be able to play all films made in the past; and the multi-channel forms of the new sound records should be reproducible alternatively as monophonic sound for drive-in theaters, and for the many small or old theaters having only a single sound channel.

OUTLINE OF THE INVENTION

In accomplishing those and other objectives, the invention places primary emphasis upon integrated utilization of the several distinctively colored media of the film. Each sound channel utilizes related distributions of two or more differently colored media, the distributions being mutually complementary in the sense that when the track is scanned by a light beam the total light transmitted by the track is essentially constant. The sound is represented as a modulation of the dominant wavelength or effective hue of the transmitted light, rather than its intensity.

Such hue modulation is most simply illustrated in the case of a sound channel employing only two dye media such as red and green, for example. At zero sound amplitude both track components are unmodulated and comprise plain areas of uniform density, typically transmitting equal intensities of red and green light. Such light has the visual hue of yellow. At maximum modulation, corresponding to maximum sound amplitude, both components vary periodically along the length of the track between maximum and minimum densities at the sound frequency, but in opposite phase. The transmitted light is then essentially constant in total intensity, but alternates in hue between substantially red and substantially green. Such light may be considered as yellow light which is modulated with a modulation amplitude sufficient to carry it essentially to red in one direction and to green in the other. Lower sound amplitudes are represented by hue variations through a correspondingly small range of hues.

In accordance with a further aspect of the invention, the modulation of hue by which sound amplitudes are represented can in principle involve a shift from any selected reference hue as equilibrium or neutral value. Also, considering different hues to be plotted in a two-dimensional array in any conventional manner, the shift of hue from its reference value may take place along substantially any axis that passes through the selected reference. More specifically, the reference hue may comprise any linear combination of the colors which are selectively transmitted by the respective layers of the film; and the hue modulation may involve proportional variations in the contributions of any selected plurality of those colors about their reference values. That multiplicity of possible paths for hue modulation can be utilized to provide additional channels of sound recording in the same film area.

In the example described above as illustration, the reference hue was taken as yellow, which is typically made up of equal intensities of the primary colors red and green, and the axis of modulation was taken as a line connecting those two primary colors and with yellow typically at its midpoint. Alternatively, as a further specific example of hue modulation in accordance with the invention, the reference hue may be selected as that corresponding to equal reference transmissions of the respective red, green and blue components of a color film. The modulation may then comprise, for example, changes of the red and green transmissions in one direction both at the same rate, and a change of the blue transmission in the opposite direction also at that rate. Such modulation might carry the transmitted light from substantially pure blue at one extreme through white to yellow at the other extreme. When the red and green components are modulated both with respect to the channel having yellow as reference hue and with respect to the channel having white as reference hue, the inherent capability of the media for modulation must be divided between those channels, reducing the amplitude of modulation that is available for each, typically by 30%. In general, however, that reduction of signal amplitude is a small price to pay for doubling the number of available sound channels that can be recorded in a given space.

An increase of the number of color components in the film to four or more clearly leads to a large increase in the distinct modulation paths that are available. In practice, the number of such modulation paths that can be effectively utilized for recording respective independent sound channels in a single film track area is considerably limited by two important conditions. In order to maintain the preferred relation that hue modulation leave the total transmitted light intensity constant, each modulation path must include density variations in at least two film color components, and must include variations of opposite sign which are so related in amplitude as to sum to zero. Also, the modulation by which one channel is represented should not affect the degree of modulation for another channel, since that would produce a spurious appearance of sound amplitude in the second channel. Nevertheless, the present aspect of the invention permits a single sound track area to accommodate without sacrifice of quality a number of independent sound channels at least equal to one less than the number of distinct color components present in the film.

A further aspect of the invention provides two distinct forms of sound track embodying hue modulation on a plurality of independent hue axes. Each type of track has particular advantages, and the preferred form may depend in part upon economic factors of a particular situation. In one type, the sound amplitudes of one channel are modulated on one hue axis, those of the other channel on the other hue axis. The illustrative examples discussed above are of that type, which has the advantage or requiring relatively simple electronic manipulation of the sound signals both in the apparatus for recording the sound and in that used for its reproduction.

The second type of multi-channel recording modulates the sum of the amplitudes of the two sound channels to be recorded on one hue axis, and modulates the difference of those amplitudes on the second hue axis. That procedure involves a form of matrixing of the signals and can readily be extended in corresponding manner to the modulation of more than two sound channels on a corresponding plurality of hue axes. The second type of track has the particular advantage that only relatively simple reproducing equipment is required for recovering both sound channels from the track in monophonic form. Consider a motion picture with a sterophonic sound track, for example, which is to be reproduced at a drive-in theater or on television, where only a single sound channel is available. Monophonic reproduction of the sterophonic track for such purposes is obtainable by relatively simple apparatus which reads the modulation on only one of the two hue axes, since that yields directly the sum of the two recorded channels. This advantage is more significant under the condition, to be described, that several parallel track areas carry respective pairs of sound channels, all of which must be combined to a monophonic signal.

The sound tracks of the invention when reproduced yield electrical signals of push-pull form, and therefore have all the well known advantages commonly associated with conventional push-pull tracks. In particular, all distortions of even order are automatically compensated.

The described type of sound track is capable of affording a further advantage of great potential importance, namely, the virtual elimination of noise due to causes such as dirt and scratches on the film. That advantage is fully attainable when the described hue modulation is produced by allowing the concentrations of the respective light absorbing media to vary only longitudinally of the film, as in conventional variable density sound tracks. All of the color components of each sound track then typically occupy track areas of the same width, and can be accurately superposed upon each other. In tracks of variable area type, such superposition can also be complete at zero modulation, as during silent passages, during which freedom from noise is especially important.

When the two mutually inverted track sections are directly superposed, as in the preferred form of the present aspect of the invention, a speck of dirt which lowers the transmission through one section will do the same for the other. Shallow scratches tend to scatter light, effectively removing it from the light beam for both emulsion layers, producing a symmetrical reduction of both signals similar to that caused by dirt. When the track is scanned by a single slit illuminating two photocells which are suitably filtered to respond only to the effective wavelengths selectively transmitted by the respective film media, the symmetrical effects of dirt on the two photocell signals are cancelled out by the subtractive push-pull output circuit. At periods of quiet sound such cancellation is virtually complete. A deep scratch that penetrates the entire emulsion usually produces an equal increase in each component signal, also leading to full cancellation.

In presence of modulation, occlusions which either increase or decrease the local transmission of both track sections no longer have an entirely symmetrical effect. At a modulation peak, for example, one track section may be nearly clear and the other nearly opaque. A track blemish then produces an appreciable unsymmetrical component that is not inherently eliminated by the push-pull configuration. The result is essentially an abrupt change in the intensity of the reproduced sound.

A further aspect of the present invention is the discovery that this particular type of noise can be compensated by causing the amplifier gain to vary under control of a suitable error signal, which can be derived, for example, from the sum of the two photocell signals. Since a dirt speck tends to decrease both those signals, while a deep scratch in the emulsion tends to increase both signals, one might expect that the error signal would need to be positive to correct for the loss of transmission caused by dirt, and that it must be negative to compensate for the increase in transmission caused by a scratch. In fact, such prior art disclosures as patent 2,527,463 to Sziklai appear to suggest use of such an error signal to reduce noise. However, analysis leading to the present invention shows that both dirt and deep scratches cause a loss of modulation, tending to reduce the amplitude of the reproduced sound. It is therefore necessary to derive an error signal having the same polarity for both types of occlusion. The present invention obtains such an error signal typically by rectifying the sound frequency component of the sum of the two photocell signals. That error signal is supplied to the sound amplifier in proper polarity to increase the gain.

An important further feature of the present invention is that the noise reduction provided by superposition of the two sections of a push-pull sound record permits an appreciable reduction in width of the sound track while still improving the overall quality of the reproduced sound. For example, division of the width of the normal track on 35 mm color film into three equal areas permits the recording of three independent sound channels, each recorded as a substantially noise-free push-pull sound record and occupying two layers of a conventional three-layer color film. Three such independent sound channels can be used in any desired manner, for example for independently controlling right, left and center speakers to provide stereophonic sound of great flexibility and high quality.

The third film layer, being fully independent of the other two, may be used for any desired purpose, such as performing control functions or as a sound track of conventional type to provide a further sound channel. That third layer may be used as a single track, or it may be divided into any desired number of sub-tracks. For example, the third layer may be divided, like the other two, into three independent tracks, which may control the dynamic range of the respective three sound channels. Alternatively, one control track area may control the dynamic range of all three sound channels, while the two remaining tracks control the switching or mixing of surround speakers. Such control permits sounds to be slowly transferred across the rear of the auditorium, effectively circling the audience. The use of an independent track for such purposes is superior to present superimposed tone systems, since the usual audio frequency discrimination filters are not required.

When the third film layer is used for such control purposes as switching or mixing auditorium speakers it is generally immaterial that the single layer does not benefit from push-pull noise cancellation. Such control actions are generally applied in a slow manner, typically in a time period of 1/10 second or more, whereas noise is usually limited to higher frequencies. However, when the control signal is used for extending dynamic range the required speed of response often overlaps the frequency range of noise caused by dirt and scratches. The present invention provides cancellation of such noise in the control circuit, or in an audio circuit derived from such a third layer, by coupling to that circuit the inverted noise voltage obtained from the sum of the push-pull sound signals read from the superimposed first and second film layers.

One or more of the tracks in the third film layer may be employed in cooperation with the first and second layers in the manner already described to provide an additional push-pull noise-free sound channel modulated on a hue axis different from that controlled by the first and second layers. With all three channels of the third layer used in that way, the invention provides six mutually independent and virtually noise-free sound channels all within the space normally occupied by a single sound channel. Such additional channels have a wide diversity of potential uses, including completely independent control of auxiliary speakers for special space effects, provision of dialog in a variety of languages, supply of a selection of program material via headphones on aircraft, and the like.

The above described division of the sound track region into three independent track areas on 35 mm film is intended only as illustration. Corresponding remarks apply to other film sizes and special track regions. For example, the invention is particularly suitable for providing two independent track areas on standard 16 mm color film, which may then afford up to four independent sound channels.

In the preceding description of color modulation, the red/green hue axis has been mentioned for illustration. However, the invention is not limited to any particular axis, nor to any particular pair of axes in the case of dual axis modulation for accommodating two sound channels.

The well known problem of recording good quality sound on 8 mm film provides an illustration of the potential advantages of selecting a different modulation axis. The sound track area on 8 mm film is quite narow and the scanning slit must be quite fine to resolve high frequencies. Hence it is sometimes difficult to obtain adequate light. Moreover, the inherent response of silicon photodetectors and the inherent emission of incandescent lamps both favor the red end of the spectrum. In fact, the photocell output for the three primary colors is typically in the order of 4 red, 2 green and 1 blue. Under those conditions, the invention preferably employs a red/cyan modulation axis, with the green and blue layers of the film together providing one component of the push-pull configuration and the red layer the other. The effective photocell output is then 4 red, 3 cyan, which is more nearly balanced and utilizes the available energy more efficiently.

Further, a significant lack of symmetry between the two push-pull components sometimes results from the difference in definition inherent in the fact that the respective color layers of the film are at different distances from film surface. That is particularly true for 8 mm film. Under such conditions the sound quality can be appreciably improved by dividing the normal track area into two side-by-side tracks. Both tracks are modulated by the same audio information, preferably on the red/cyan axis in the case of 8 mm film, but the respective tracks are modulated in opposite polarity. In reproducing such a record, a difference signal is derived from each track, as already described. The resulting signals both suffer from the same non-symmetry with respect to positive and negative swings of the modulation, but the audio information is in opposite phase in the two signals. Therefore subtraction of the signals recovers the information and cancels the distortion.

The invention further provides apparatus for economically and effectively utilizing color sound tracks having the described advantages, including optical and electronic apparatus for producing such sound records and for obtaining electrical sound signals from them.

BRIEF DESCRIPTION OF THE DRAWINGS

A full understanding of the invention, and of its further objects and advantages, will be had from the following description of illustrative manners of carrying it out. The particulars of that description, and of the accompanying drawings which form a part of it, are intended only as illustration and not as a limitation upon the scope of the invention, which is defined in the appended claims.

In the drawings:

FIG. 4 is a schematic drawing illustrating one manner of recording two sound channels in a common track area in accordance with the invention;

FIG. 5 is a schematic drawing representing means for reproducing sound typically recorded in accordance with FIG. 4;

FIG. 6 is a schematic drawing illustrating another manner of recording two sound channels in a common track area;

FIG. 7 is a schematic drawing representing means for reproducing sound typically recorded in accordance with FIG. 6;

FIG. 8 is a schematic transverse section of a film and sound track embodying a further aspect of the invention;

FIG. 9 is a schematic diagram representing illustrative apparatus for reproducing a sound track according to FIG. 8;

FIG. 10 is a schematic elevation representing optical apparatus for reproducing a three track sound record in accordance with the invention, as embodied in a conventional motion picture projector;

FIG. 11 is a section on the line 11—11 of FIG. 10;

FIG. 12 is a schematic graph illustrating typical optical behavior of the apparatus of FIGS. 10 and 11;

FIG. 13 is a schematic elevation in the general aspect of line 13—13 in FIG. 10 representing typical active surface areas of a photosensor corresponding to FIG. 12.

DESCRIPTION OF ILLUSTRATIVE EMBODIMENTS

Figure 1:
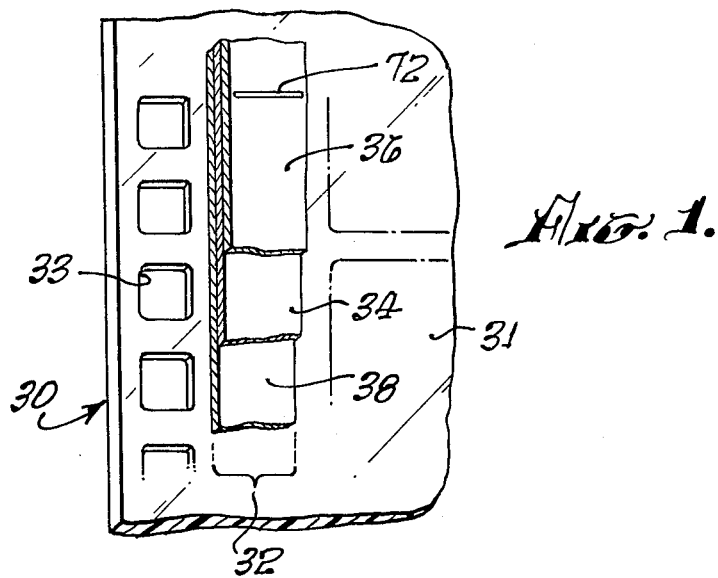
FIG. 1 is a schematic perspective, representing an illustrative color sound track according to the invention.

FIG. 1 shows schematically an illustrative sound track 30 in accordance with the invention, carried on the film base 31 with the sprocket holes 33. For clarity, the three color layers of a typical color positive film are shown only at the sound track region 32. Actually, of course, each color component layer normally extends over the entire area of the film. The upper color layer 34 is ordinarily the green absorbing layer, with the red absorbing layer 36 in the middle and the blue absorbing layer 38 next to film base 39.

The green and red color component layers 34 and 36 of film 30 typically have longitudinal density variations that are closely integrated, jointly representing the sound amplitude variations of a sound channel. In accordance with one aspect of the invention the densities of the green and red layers vary longitudinally of the film in mutually inverse relation, forming the two components of a variable density push-pull representation of the sound channel. For clarity of description, blue layer 38 will initially be assumed to be unmodulated.

Figure 2:
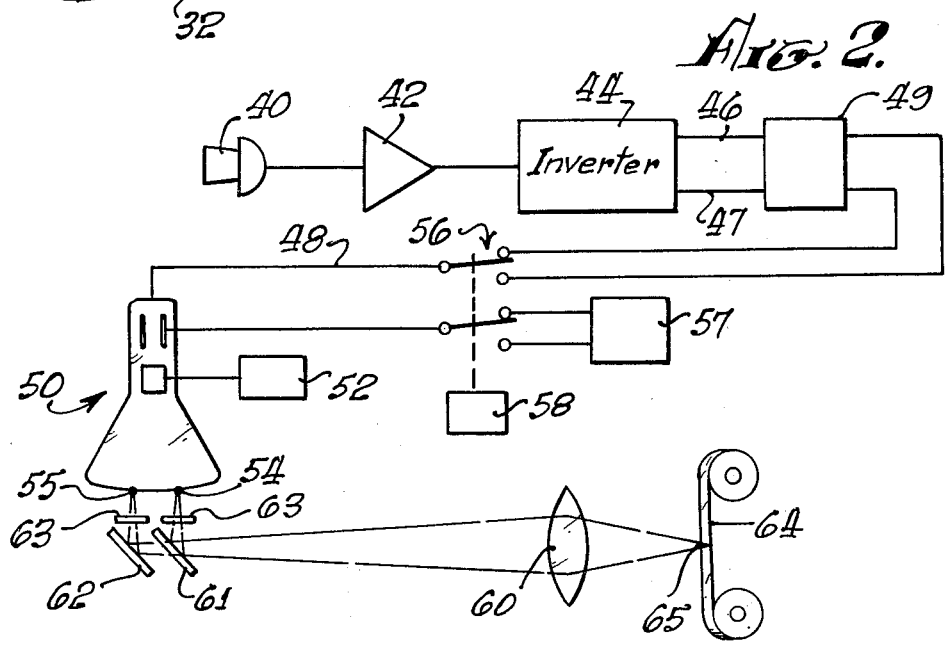
FIG. 2 is a schematic drawing representing apparatus for recording sound in accordance with one aspect of the invention.

Such a sound record can be produced by many different types of recording apparatus, of which that shown schematically in FIG. 2 is illustrative. A microphone or other sound source is represented at 40. The resulting sound signal is amplified at 42 and supplied to the inverter 44, which produces on the lines 46 and 47 two sound signals which typically oscillate about the same reference voltage with opposite polarity. Those signals may be further modified if desired by the circuitry 49, for example for noise reduction.

The cathode ray tube 50 includes means for producing a beam of intensity responsive to the signal supplied on the line 48. The beam is caused to scan continuously in a plane perpendicular to the plane of the drawing in response to control voltages from the conventional scanning source 52, producing a bright line on the face of the tube. The position of that line is shifted periodically between the two positions 54 and 55 in response to two voltages supplied alternately via the switch 56 from the voltage source 57. Switch 56 also synchronously connects lines 46 and 47 from inverter 44 alternately to the brightness control of the cathode ray tube. Switch 56 is driven from 58 at a frequency several times the highest sound frequency to be recorded. Although shown in mechanical form for clarity, switch 56 is in practice an electronic switching device of any suitable type.

Scanned lines 54 and 55 are made to emit light of different colors, green and red in the present examples, as by coating different phosphors on their respective regions of the tube screen, or simply by providing color filters in each beam, as indicated at 63. The resulting green and red beams are reflected by the 45° mirrors 61 and 62 along aligned paths, mirror 61 being typically a dichroic mirror of known type that freely transmits the red light of beam 55. The combined beams are then focussed by the lens 60 on the continuously moving unexposed color negative 64. Lens 60 is selected to have longitudinal chromatic aberration which just compensates the distance between lines 54 and 55 producing sharp focus of both lines in precise superposition on the moving film at the common image 65. The exposures both on the color negative film and on the color positive to which that is later printed are preferably adjusted to produce color selective densities within the linear portion of the characteristic curves of those films.

When the resulting sound record, as typically represented in FIG. 1, is optically scanned by a narrow slit image, brightly illuminated with white light, the total intensity of green and red light transmitted by the film remains constant, since an increase in the effective film density in one spectral region is accompanied by a corresponding decrease in density in the other region. Those changes, however, produce a shift of the average or dominant wavelength of the transmitted light. That wavelength shift represents a variation in color or hue of the transmitted light, without any variation in the light intensity. The sound amplitudes are thus recorded on the film in the form of hue modulation.

For reading the color record of FIG. 1 it is, of course, necessary to distinguish between the densities of the three superposed layers. If the track region is scanned by a narrow illuminated slit, such as is used for reading a conventional optical sound track, many techniques are available for dividing the transmitted beam optically into the colors that are selectively absorbed by the respective color media or layers. Each component beam can then be sensed with a photocell or equivalent transducer to produce an electrical signal. One available and efficient method is to reflect the beam successively at two dichroic mirrors which reflect the red and blue spectral regions selectively and transmit the green. The purity of each beam can then be sharpened by a conventional filter.

Such a system is described, for example, by Kaprelian et al in U.S. Pat. No. 3,281,151, in which three entirely independent sound channels are recorded in respective color layers of the film and are superposed merely to save space. Although that configuration attains three sound records on a standard 35 mm color film, each of them is subject to all the well known variations, distortions and noise which have long limited the use of single variable density sound tracks.

Figure 3:
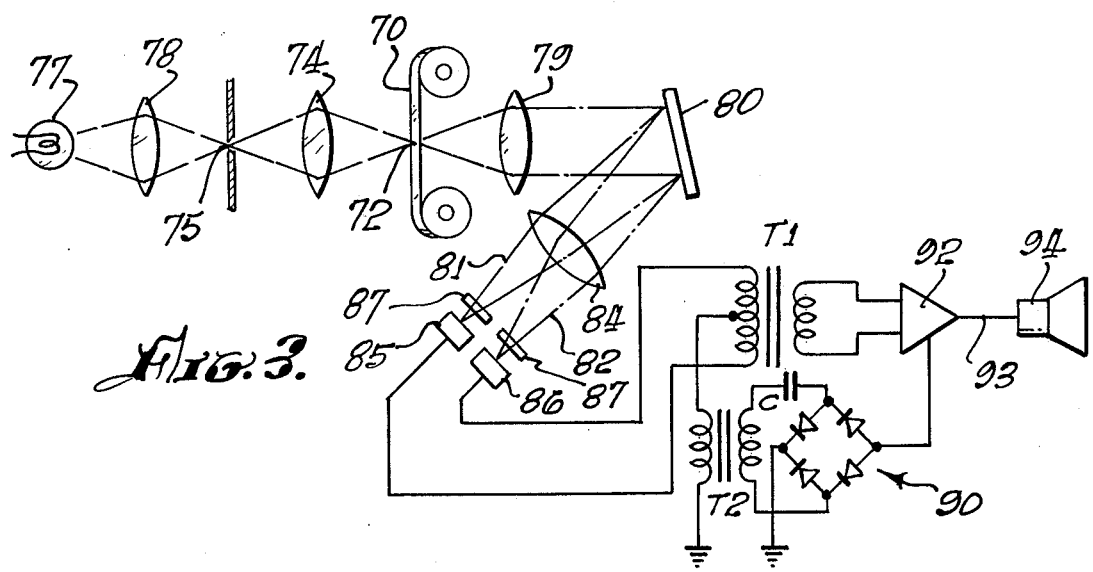
FIG. 3 is a schematic drawing representing apparatus for reproducing sound from a record typically produced according to FIG. 2.

The illustrative reproducing apparatus shown schematically in FIG. 3 does not require any dichroic mirrors, and is readily modified to accommodate any desired number of different wavelength regions. The moving color positive film is indicated at 70. The physical slit 75 is brightly illuminated by the lamp 77 and the lens 78, and is imaged by the lens 74 as the stationary, uniformly illuminated slit image 72 on the film. The light transmitted by the film at slit image 72 is collimated by the lens 79 and strikes the diffraction grating 80 at such an angle that the red and green components of the light are diffracted in the directions typically indicated by the beams 81 and 82. Grating 80 may be of transmissive type, if preferred. Beams 81 and 82 are focussed by the lens 84 at the sensitive surfaces of the respective photosensors 85 and 86. Supplementary color filters may be introduced at 87. Since each of the photosensors receives only light energy that has been selectively absorbed by one of the color component media of film 70, the signal it produces corresponds to the density variations of that one component. Hence the two signals from a push-pull representation of the original sound amplitudes.

As schematically shown in FIG. 3, the outputs of transducers 85 and 86 are supplied to the opposite ends of the primary winding of the transformer T1. The secondary output then represents the difference of the two input signals, as in conventional push-pull output circuits. That difference signal is amplified in the variable gain amplifier 92 for supply to the loudspeaker 94. For the sake of clarity, FIG. 3 and other figures omit detailed circuit elements such as blocking capacitors, biasing circuits and the like, which are conventional and do not require specific description.

As already indicated, the fact that the same two color components of the sound record are directly superposed on film 70 virtually eliminates the noise that is caused directly by occlusions on the film. Whether such occlusions comprise dirt particles which reduce the light transmission or scratches which increase it, the primary effects on the two color components tend to be identical, so that transformer T1 receives no net signal. As a result, sound reproduced from the described sound tracks is immediately recognizable by its remarkable freedom from noise.

However, occlusions on the film also cause a secondary type of disturbance in the reproduced sound, which is unsymmetrical with respect to the two color components of the track and therefore is not eliminated directly by conventional push-pull circuitry in the reproduces. A further aspect of the invention compensates that secondary disturbance. In the present illustrative circuit that is accomplished by circuitry responsive to noise frequency variations in the sum of the signal from the two transducers 85 and 86. Such a sum signal is available at the center tap of the primary of transformer T1, which is nominally held at a reference potential, shown as ground. That sum signal is led to ground via the primary of transformer T2, producing a corresponding current in the transformer secondary. That circuit is rectified in the full wave rectifier 90, and the resulting signal is supplied as gain control signal to amplifier 92 in polarity to increase the amplifier gain in response to a signal of either polarity in T2.

That rectification of the sum signal is a critical feature of the present circuit, since it has been discovered that although dirt and deep scratches on the film produce opposite changes in the sum signal, both tend to reduce the output sound signal and therefore require an increase of amplifier gain for effective compensation.

The exact nature of that action may be clarified by a typical example. Assume for definiteness that the output signal from each sensor is 10 volts at zero modulation, and varies between 0 and 20 volts at 100% modulation. A relatively loud sound signal corresponding to 50% modulation then produces peak signals of 15 volts at one sensor and 5 at the other, for a difference signal of 10. A dirt particle obscuring 10% of the scanning slit area reduces both sensor signals momentarily by 10%, giving signals of 13.5 and 4.5 volts for a difference signal of 9. The net audio signal supplied to amplifier 92 is thus reduced by 10%, or a drop in output sound level of about 0.8 dB.

In the case of a scratch that penetrates the emulsion, a clear area is produced in which the transmission of all wavelengths is increased to its maximum value. If such a scratch covers 10% of the slit area, for example, each sensor signal is increased to its maximum value at that tenth of the area, while the other nine tenths of the area are unaffected. Hence the total signal is increased by 10% of the interval between its proper value and the maximum signal. At the previously assumed 50% modulation, with normal sensor outputs of 15 and 5 volts, such a scratch will shift each signal 1/10 of the way to 20, yielding 15.5 and 6.5, respectively, for an output difference signal of 9, down 10% from the correct value. Thus, the scratch and the dirt particle have identical effects on the sensed sound signal.

The present invention detects such changes of effective track area independently of their effect upon the sound signal itself, and alters the amplifier gain by a compensating amount. In the present example, the sum of the two sensor signals is normally 20 volts regardless of the degree of modulation. As seen from the above figures, the dirt particles alters that sum to 18, whereas the scratch alters it to 22. Thus in each case the absolute value of the sum signal change produced at the transformer tap is the same, but its polarity is different. Rectification at 90 causes equal pulses of the same polarity to be delivered to amplifier 92. With suitable adjustment, as by selection of the winding ratio of T2, the amplifier gain is momentarily increased by the proper percentage to correct the loss of sound signal amplitude due to the occlusion, which was 10% in the present example.

Corresponding compensation is obtained for occlusions affecting track areas different from the assumed 10% and for sound amplitudes corresponding to modulations different from the assumed 50%. Thus, even very severe damage to a track of the present type can be fully compensated by the invention. That is true so long as the damage affects both superposed layers equally and leaves at least a small track area unaffected so that enough light is modified by the color selective densities to provide an effective reading of the ratio of those densities. For that ratio is the same, whether read from the entire scanned area of the track or from a small fraction of that area.

By thus interpreting the sound record solely in terms of color ratio, the invention reproduces sound virtually free from noise and distortion, not only in the respects familiar from previous push-pull recordings, but also with respect to spurious sound signals directly produced by track occlusions, and with respect to the abrupt deviations of sound amplitude produced by the same cause in presence of sound modulation. The invention thus permits a track consisting of a superimposed push-pull color pair to be interpreted correctly as color ratio, independently of local aberrations which affect both track sections.

It is a common practice in sound recording to increase the average density of the sound record during quiet periods, thereby reducing the noise content of the reproduced sound resulting from film grain. If that modification is limited to relatively quiet sound passages the sound modulation does not extend beyond the linear range of the film. Circuit 49 of FIG. 2 may perform that function. More particularly, inverter 44 may typically comprise a transformer with a center tap on the secondary connected to a source of reference potential. The noise reducing function may then be performed by circuitry of any suitable type at 49 for varying that reference potential under control of the sound amplitude. The mean brightness of both lines 54 and 55 on the face of cathode ray tube 50 is thereby modified, typically toward lower intensity. Less exposure of negative film 64 makes the developed image lighter and the final printed positive film 70 of FIG. 3 darker.

When noise reduction of that general type is employed, the change of average density of the sound track produces a sum signal at the tap of the primary of transformer T1 in FIG. 3, which might produce an undesired change of gain of amplifier 92. However, since the average track density varies only slowly compared to the noise frequencies to be compensated, its effect on amplifier 92 can be blocked by inserting a high pass filter, for example between the secondary of T2 and rectifier 90. With a suitably selected filter, represented as the series capacitance C, the rectified noise frequencies due to occlusions continue to be transmitted to amplifier 92, and accomplish the described noise compensation.

In the preceding discussion, the blue color component of the sound track area was assumed to be unmodulated. Actually, with one sound channel hue modulated on the red/green color axis, as described, the inherent advantages of that sound record are not affected by modulation of the third medium to carry any desired type of information as a single track. That information may comprise control signals of any sort, for example, or may represent the sound variations of a second channel. Such a single track does not have the inherent freedom from noise of the described hue modulated joint track, but is can be given much of that freedom by suitable coupling circuitry, as will be more fully described.

In presence of one hue modulated joint track, such as the red/green track already described, a preferred manner of recording additional information is to modulate it on another hue axis that employs the reference hue of the first record, which is yellow in the present example, as one extreme of the hue modulation. The other extreme is then typically the color of the third color medium of the film, which is blue in the present instance. If a second sound channel is modulated in that manner, the blue medium density varies with the amplitude variations of that channel in one polarity and the red and green medium densities both vary with those same amplitude variations in the opposite polarity. That common variation of the red and green densities does not affect reproduction of the first sound channel because it does not involve any change of hue. More particularly, the reproduction circuit responds only differentially to the red and green densities. On the other hand, all of the advantages, such as noise elimination, that were described as inherent in the first channel record are also inherent in the second channel record.

FIG. 4 shows in schematic form typical circuitry for use in recording the two sound channels M1 and M2 on the three color media of a film, typically shown as red, green and blue. The sound for the respective channels is received by the indicated microphones. The resulting electrical signals are amplified and are supplied to respective inverting circuits, each of which produces two similar sound signals of opposite polarity. The upper output from each inverter will be referred to as positive, the lower one as negative. The positive signals for channels M1 and M2 are supplied to a summing circuit of any suitable type, and the output signal is modulated on the red medium of the film. The negative signal for M1 and the positive signal for M2 are similarly summed and the output is modulated on the green film medium. The negative M2 signal is directly modulated on the blue medium. The actual modulation may be performed, say, by circuitry analagous to that of FIG. 2, switch 56 having three poles rather than two.

For reproducing the sound from a dual channel record of the type just described, electrical signals for the respective color components are read from the track in any suitable manner. Apparatus similar to that of FIG. 3 may be employed, for example, with addition of a third light sensing transducer mounted beside transducers 85 and 86 in position to receive the blue light transmitted by film 70. Three such transducers for the red, green and blue components are indicated in FIG. 5.

The red and green transducer outputs are supplied to the respective input terminals of a difference circuit, shown typically as the transformer T1, which performs essentially the same function as T1 in FIG. 3, producing from its secondary winding a sound signal corresponding to sound channel M1. The center tap on the primary of T1 receives a signal corresponding to the sum of the red and green transducer outputs, which thus represents the common modulation carried by the red and green film media in their role as one record component of the M2 sound channel. That sum signal is supplied to one input of a second difference circuit, shown typically as the transformer T3, the other input terminal receiving the other record component of channel M2 from the blue transducer. The resulting difference signal at the output of T3 thus represents the sound of channel M2. The two output signals, denoted M1 and M2 in FIG. 5, are then amplified and otherwise processed and utilized as desired. If channels M1 and M2 are the stereophonic channels of common program material, for example, they typically control right and left speakers on a stage. Both channels exhibit the previously described substantial immunity from noise caused directly by occlusions on the film.

If it is desired to improve the sound quality further by compensating the sound amplitude variations due to occlusions in presence of modulation, as described in connection with FIG. 3, the primary tap of T3 in FIG. 5 may be connected to ground via circuitry responsive to any noise frequency signal that it carries. That signal is then rectified and employed to control the gain of the amplifiers in either or both of channels M1 and M2. The action is functionally equivalent to that of transformer T2, filter C and rectifier 90 of FIG. 3.

FIGS. 6 and 7 correspond generally to FIGS. 4 and 5, but illustrate an alternative manner of recording and reproducing two independent sound channels on respective hue axes, typically in a single sound track area. Both procedures employ basically similar principles. However, in the recording procedure of FIG. 6 the two signals that are modulated on the respective hue axes, red/green and blue/yellow in the present example, are not directly the M1 and M2 sound signals; instead they are the signals M1 + M2 and M1 − M2. Those sum and difference signals are developed by any suitable sum and difference circuits, typically comprising a summing amplifier and a differential amplifier of conventional design. The resulting sum and difference signals are then typically manipulated and modulated on the respective hue axes in the manner already described for the initial sound signals in connection with FIG. 4.

For reproducing the dual channel record just described, the initial procedure is typically the same as for the record produced by FIG. 4. However, as typically indicated in FIG. 7, the difference between the red and green transducer outputs, formed by transformer T1, represents the sum of the channels M1 + M2; while the difference between the red + green and the blue transducer outputs, formed by transformer T3, represents the difference of the channels M1 − M2. Those difference signals are summed to derive the M1 sound, and are subtracted to derive the M2 sound. Those output signals have the noise immunity that has been described, since each of the difference signals does so.

It will be noted that the recording and reproducing systems of FIGS. 4 and 5 are simpler electronically than those of FIGS. 6 and 7, in that each omits a sum and a difference circuit. On the other hand, the modulating procedure of FIG. 6 offers an advantage of versatility in reproduction which has particular value when a dual channel stereophonic track is to be reproduced in a drive-in theater, or in a small or old theater, which has facilities for only a single sound channel. Under that condition, both stereophonic channels must be electrically combined to drive the single loud speaker channel. Otherwise a part of the program material will be lost. With the modified recording procedure of FIG. 6, one component of the dual record already represents the sum of the two sound channels. Therefore suitable monophonic sound can be obtained from such records by reproducing only that one component. Only the red and green film media need to be read from the film; and a simple difference circuit, such as transformer T1 of FIG. 7, then directly produces the desired monophonic sound. Thus relatively little investment is required to make such stereophonic records effectively compatible with monophonic theater sound systems. In contrast, monophonic reproduction of a stereophonic record made according to FIG. 4 requires means for reading all three film media, performing all the electrical operations indicated in FIG. 5, plus an adding circuit to combine the two sound channels.

It is emphasized in connection with FIGS. 4 to 7 that the described hue modulations of two independent signals may be carried out in principle on any two hue axes that are effectively independent of each other. For example, the role played by the red/green axis in these examples might instead be assigned to the blue/green axis, with the color cyan as reference hue; and the second modulation axis would then typically comprise the red/cyan axis. Alternatively, red/blue may comprise one modulation axis with magenta as reference hue.

Green/magenta is then typically the second axis. Selection of the most advantageous axes for such dual modulation pairs, like the selection of an axis for modulation by a single channel as illustratively shown in FIGS. 2 and 3, depends upon such factors as the effective optical definition obtainable with the respective color media, the relative intensities of light in the corresponding regions of the spectrum, the relative positions on the film of the respective layers, in the case of films having the color media arranged in distinct layers, and the like.

An example of such distinctive conditions is the well known difficulty of obtaining satisfactory sound reproduction from the limited track width available on narrow gauge films such as standard 8 mm film, for example. As already indicated, the limited light energy available from a sound record under such conditions can be utilized more effectively if the blue and green color media of the film are treated collectively, forming in effect a cyan medium. Cyan then typically becomes one extreme of a red/cyan modulation axis.

To record a track of that type, one push-pull component of the sound signal simply modulates both the blue and green recording light beams, while the other component modulates the red recording beam. Circuit means for the reproducer are typically as shown in the upper portion of FIG. 9, comprising a circuit for summing the green and blue transducer output signals for delivery to one input of the transformer T4, the other input receiving directly the red transducer output. The signal from the secondary of T4 then represents the sound that was recorded.

Sound recorded in that way has the advantage of the substantial noise reduction inherent in hue modulation, as already described, and shares the relative freedom from even order distortion that is characteristic of push-pull systems. However, some residual distortion tends to remain, due to the lack of symmetry in behavior of the respective color layers of the film. That is especially true when the high frequencies are preemphasized in order to improve the high frequency response in view of the relatively slow speed of 8 mm film past the scanning slit image.

Such residual distortion is appreciably reduced by a further feature of the invention. Despite the narrow track area available on typical 8 mm film, that area is divided into two side-by-side tracks, shown in transverse section in FIG. 8. Both those tracks are hue modulated by the same sound signal, preferably on the red/cyan hue axis just described, and in opposite polarity. Thus, when track 1, shown on the left, is at the modulation extreme with the green and blue layers optically dense and the central red layer optically transmissive, track 2, at the right, has the green and blue layers transmissive and the red layer dense. The sound signals from tracks 1 and 2 are typically recovered as the outputs of the respective transformers T4 and T5 of FIG. 9, those signals being nominally identical in form but of opposite polarity. The signals from the respective tracks are combined by a difference circuit of any suitable type, shown as the transformer T6, yielding at its output the sound signal of the single channel M1.

With that arrangement, the hue modulation gives each track inherent freedom from noise and normal distortion; while any distortion in each track, caused by non-symmetrical relation between the positive and negative swings of the modulation, for example, is compensated by the same non-symmetry at opposite polarity in the other track. This arrangement permits tracks 1 and 2 to be hue modulated with the Accordingly, relations and the amplitude capability of class B modulation. However, the relationship between track 1 and track 2, as seen by T6, corresponds to class A modulation. This dual track arrangement can be employed with other types of film, including 16 mm and 35 mm, for example, when it is desired to achieve the ultimate in maximum signal, minimum noise, minimum distortion and maximum frequency response.

A further important aspect of the invention, which may usefully form a modification of virtually all the illustrative embodiments so far shown, is the possibility to reduce drastically the width of the sound track required for recording each sound channel. In the prior art the minimum width of sound track required to produce satisfactory sound has been set in large part by the need to produce realistic sound of high intensity and also to produce very quiet sound passages that were free from disturbing noise, especially as the release print became scratched or dirty from repeated use. By inherently mastering such causes of noise, the present invention has been found to permit simultaneously an improvement in sound quality and a significant reduction in the width of a photographically recorded track.

In practice, it has been found feasible to divide the conventional sound track area on present day 35 mm color film, which is indicated schematically at 32 in FIG. 1, into three distinct tracks. Each of those tracks can then be hue modulated by an independent sound channel, leaving the third color layer of the film to carry additional information. Alternatively, one or more of the tracks may be hue modulated on two color axes to carry two independent sound channels. Thus a total of six sound channels of improved quality are made available in the space normally occupied by a single channel.

Recording of such multiple sound tracks can be accomplished with apparatus basically similar to that of FIG. 2, for example, with addition of further microphones and signal processing circuits to accommodate the desired total number of channels. The sound signals for those channels are alternately supplied via line 48 to the intensity control of cathode ray tube 50 in synchronization with the sweep movement of the electron beam. With suitable time relations, the beam intensity is then controlled by the respective sound channels during definite portions of each beam sweep, those portions corresponding to the respective track sections on film 64. Such synchronization is readily obtainable by means of electronic switching circuitry of conventional type, controlled in definite time relation to the sweep voltage generated at 52. That switching circuitry is typically inserted between switch 56 of FIG. 2 and the signal modifiers 49 of the respective sound channels. Control means 58 for switch 56 is preferably coupled via a counting circuit to sweep control 52 so that an integral number of beam sweeps and cycles of channel switching occurs at each beam position on the face of the cathode ray tube.

Figure 14:
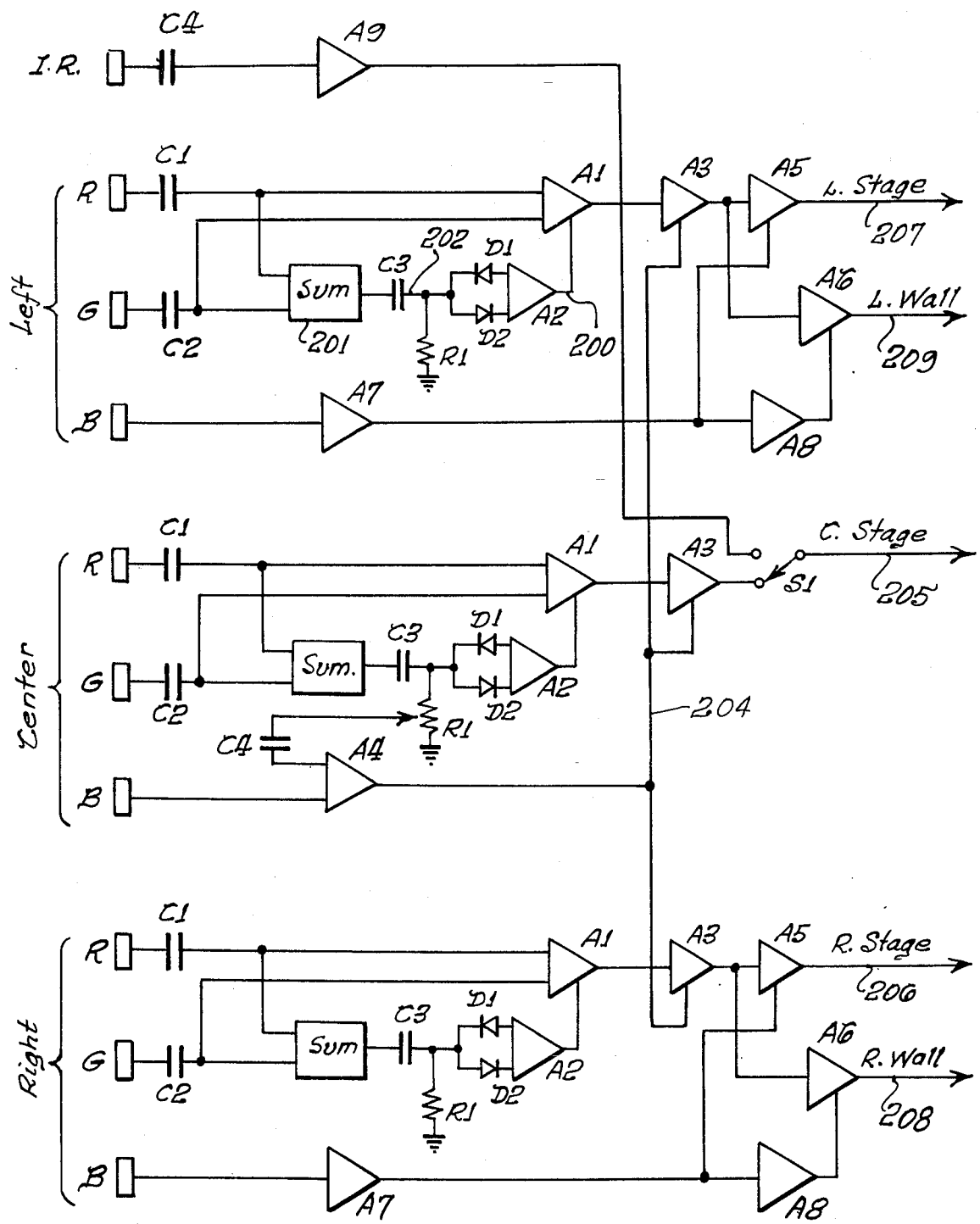
FIG. 14 is a schematic diagram representing illustrative electrical apparatus for use in reproducing a three track sound record embodying the invention.

For reproducing sound from multiple tracks of the described general type, it is desirable to provide relatively simple and economical apparatus which can be installed on most or all of the motion picture projectors already in use in theaters, as well as in new machines. The apparatus represented schematically in FIGS. 10 to 13, with illustrative electrical circuitry in FIG. 14, is especially useful in that respect. The color discriminating system can be made remarkably compact, so that it can directly replace the single photocell of a conventional sound reproducer, with minimum modification of the surrounding structure. For illustration, the sound record is assumed to comprise three side-by-side track areas, each carrying one sound channel hue modulated on the red/green hue axis, and employing the blue film layer for illustrative control functions, to be more fully described. The sound channels are assumed to represent left, center and right components of a stereophonic system.

In many conventional sound reproducers as now used with existing theater motion picture projectors the film 130 is guided over a drum 150 by rollers indicated at 154 in FIG. 10. Drum 150 is mounted on the shaft 151 and is driven at constant speed by means not explicitly shown. The drum has a peripheral flange 152 on which the film is supported with the sound track region 132 projecting beyond the flange edge. A scanning light beam 156 is produced by an incandescent lamp 155 and focused by suitable optical means 157 to a very narrow slit image 158 perpendicular to the length of the sound track. That slit is typically a real image having a width of the order of 0.001 inch and sufficient length to span the entire usable width of the optical sound track, including all three track sections, typically 0.084 inch. The resulting beam, transmitted and modulated by the single monochrome sound track of conventional practice, is commonly received and sensed by a photocell mounted inside the drum and receiving the beam directly without intervening optics.

The present invention typically retains the same scanning optics 155 and 157 without substantial change. The complete channel discriminating optical system 160 is preferably accommodated within drum 150, which usually has an inside diameter of about 1.5 inches. The system is typically mounted, by means indicated schematically by dashed lines in FIG. 11, on a single bracket 140 which is designed to be supported from the same base that held the photocell bracket of the previous reproducer. The transmitted and modulated light beam 159 is collimated by the lens 162 and delivered to the prism 164 of high dispersion optical glass. Light from the prism is preferably folded, as by the totally reflecting prism 169, to make the system more compact, and is focused by the lens 168. Acting in combination, lenses 162 and 168 image slit 158 at the image surface 172 with the slit length extending perpendicular to the plane of FIG. 10. The light for each wavelength region is differentially displaced parallel to that plane by the color dispersion of prism 164, forming a typical spectrum which comprises a continuous series of images at positions depending upon the wavelength. Prism 164 can be replaced, if desired, by a diffraction grating of transmission type, operating basically like grating 80 of FIG. 3.

FIG. 12 shows at 180 a typical dispersion curve for prism 164, plotted as angular dispersion at an arbitrary scale against wavelength in nanometers. Also plotted against the same wavelength scale are curves 181, 183 and 185, representing the dye densities developed in the respective color layers of typical Eastman color positive film. The peak areas of those curves are blocked off at 181a, 183a and 185a to indicate wavelength regions which are predominantly characteristic of the respective dyes. Those are therefore the preferred regions to be selectively sensed by the three respective photoreceptors. By projecting those selected wavelength regions upward to dispersion curve 180 and horizontally from that curve, as indicated in the figure by dashed lines, a plot in angular measure is obtained, showing the relative positions 182, 184 and 186 of the respective wavelength regions at image surface 172. The colors and typical wavelength limits of those positions are indicated for convenience on the drawing.

Also indicated in FIG. 12 is a corresponding image region 188 for infrared radiation between 700 and 1000 nanometers. That band contains a large proportion of the energy of an incandescent lamp, and represents the primary active radiation for conventional optical sound tracks in which the color dyes have been chemically replaced by silver as in many older films. According, by including in the present system a capability for responding to that infrared spectral region, such old sound tracks can be played by the present apparatus after a simple switching operation.

The invention typically employs a semiconductive silicon transducer which has been constructed in known manner to produce photosensitive areas of its surface conforming to the light distribution just described at image surface 172. Such a transducer is shown schematically at 190 in FIGS. 10 and 11; and typical configuration of its sensitive areas is shown in FIG. 13. Thus FIG. 13 is a view of transducer 190 in the general aspect indicated in FIG. 10. However, the drawing is inverted to facilitate description by making the order of the different sensitive regions agree with the wavelength regions of FIG. 12. Suitable provision is made in conventional manner to connect electric lead wires to each individual light receiving area of the transducer surface, but such connections are omitted for clarity of illustration.

The three areas 192, which receive blue light, are typically separated by relatively wide insensitive regions 193, which act as septums between the respective control channels that are recorded in the blue layer of the film. Such septums are desirable to prevent crosstalk between the tracks due to film weave as it passes over the scanning drum. Whereas the effective area of the tracks is thereby reduced, the resulting slight increase of signal to noise ratio is not a critical factor, especially for the relatively slow control action of the two side tracks. Noise on the central track is reduced by circuit coupling to the superimposed sound channel, to be more fully described.

The photosensitive areas 194 and 196 for the green and red sections of the three push-pull sound tracks do not require septums since complete isolation of the stereophonic channels is not required. In fact, during dubbing, some of the sound from one channel is usually placed intentionally on adjacent channels at a reduced level. Thus film weave merely introduces a bit more of this mixing, but is of no consequence for three-track stereo. Hence the spaces 195 and 197 between channel areas are typically made only wide enough to provide electrical insulation. One or two mils suffices for that purpose. Septums 193 for the blue component may similarly be omitted when it is used for stereophonic sound channels rather than for control.

Sensing surface 198, which receives infrared radiation 188 of FIG. 12, is typically a unitary area producing a single electrical response. Thus, it integrates the total transmitted light when used to read the conventional variable are dual push-pull tracks of chemically deposited silver that have been widely used by the motion picture industry. During reproduction of the new color sound tracks of the present invention, sensing area 198 is inactive.

FIG. 14 shows illustrative electronic circuitry for processing the multiple signals produced by the photosensitive assembly of FIG. 13. For each of the right, center and left channels the red, green and blue sensors are indicated by the letters R, G and B. Inrared sensor 198 is marked IR. The output lines 205, 206, 207, 208 and 209 at the right of the drawing provide sound for various locations in the auditorium, typically designated center stage, right and left stage, and right and left wall, respectively. Each line typically controls a power amplifier which drives one or more speakers at the indicated location.

In each of the right, center and left sound channels the outputs from the red and green sensors are supplied via the capacitances C1 and C2 to the respective input terminals of the differential amplifier A1. The amplifier output in each channel then represents the difference between the red and green signals, conforming to the conventional push-pull function.

The present circuits provide the further function of variable amplification under control of a rectified sum signal derived from the red and green sensors. As illustratively shown, differential amplifiers A1 are themselves of the known type which has variable gain in response to an applied control voltage. The output from each summing circuit 201 is normally constant, since one input is the inverse of the other. The sum signal is coupled via the blocking capacitance C3 to the line 202, which is normally held at ground potential by the biasing resistance R1. Any departure of the sum from its equilibrium value is coupled via one or the other of the oppositely poled diodes D1 and D2 to the corresponding input terminal of the differential amplifier A2. The control signal delivered from A2 to line 10 then represents the absolute value of the variation of the sum signal, departing from its normal value in the same direction for both positive and negative swings of the sum. The polarity of that control signal is selected to increase the gain of amplifier A1. The rate of that response is typically so adjusted, as by selection of the gain of A2, that the percentage increase in the gain of A1 above its normal value equals the percentage deviation from normal of the sum of the red and green signals. A constant amplitude sound record then produces at the output of A1 an electrical sound signal which maintains constant amplitude despite variable shading of a portion of scanning slit 158 (FIG. 10), producing noise compensation of the type already described in connection with transformer T2 and rectifier 90 of FIG. 3.

A further significant factor in improving the present sound reproduction is the means for expanding the dynamic range under positive control. In the illustrative system of FIG. 14, that control is derived from the blue density of one of the three channels. Each channel includes a separate variable gain amplifier A3 for volume expansion, with gain responsive to a control voltage supplied from the common line 204. That voltage, as shown, is developed by the differential amplifier A4 from the blue density sensor in the center channel. The negative input terminal of A4 is coupled via the capacitance C4 to a variable tap on resistance R1. An adjustable portion of any variation in the sum signal described above as representing the sum of the red and green sensor outputs is therefore effectively subtracted from the output of the blue sensor before it is supplied to line 204.

That relatively simple circuit action overcomes much of any disadvantage resulting from derivation of the dynamic range control signal from a single track which does not have the desirable characteristics of a push-pull control. In particular, any signal deviation due to a change of the effective area of the blue track caused by dirt or scratches is substantially compensated, since a corresponding signal change occurs in the red and green tracks. By subtracting an appropriate fraction of the red and green sum signal variation at A4, the blue control signal delivered to line 204 is essentially free of noise. Availability of that degree of noise elimination permits the dynamic range control at the amplifiers A3 to alter the sound volume at rates that include frequencies extending well into the audio range.

FIG. 14 further includes circuit means for proportionally shifting the stereophonic components of the sound between the normal speakers at the left and right sides of the stage and special effects speakers installed on the left and right walls of the auditorium. That action is preferably controlled separately at the left and right sides of the auditorium.

Such control is made available in the present system by using the blue signal in the left and right channels of the film for shifting the corresponding sound. The output from amplifier A3 in each of the side channels is divided between two variable gain amplifiers, of which A5 supplies the side stage speakers and A6 supplies the wall speakers. Control signals from the left and right blue sensors are separately amplified by the respective amplifiers A7. Each is then supplied in parallel to the control terminals of A5 and A6, but with inversion of the control signal at A8 before supply to A6. The result with suitable biasing and adjustment, is that with the control signals at one end of their range all the sound of the side channels is delivered to the side stage speakers; and as each signal approaches the other end of its range the sound is proportionally shifted to the wall speaker. During passages when the wall speakers are to be used, the sound recorded in the side channels can, of course, depart from normal stereophonic sound components to any desired extent. Since the sound shift between stage and wall speakers is normally slow compared to noise frequencies, noise compensating circuits corresponding to the loop through C4 in the center channel are not ordinarily required, but may be provided if desired.

The output from the single infrared sensor IR is amplified by the amplifier A9 and supplied to one terminal of the double throw switch S1. With the switch in the position shown, the center stage line 205 receives its sound information from the red and green sensors of the center channel, typically with the modifications that have been described. By shifting the switch, the center stage sound is derived instead from the single IR sensor. The present system can then handle a conventional motion picture film with silver sound track of either variable area or variable density type. The monophonic sound from such a track is reproduced over the center stage speaker with substantially the same quality as can be obtained with reproducing equipment of the conventional type designed for that purpose. Additional switching devices, not explicitly shown, may be provided to ground the portions of the present system that are not used under such conditions, or for making other circuit modifications that may be desired.

I claim:

1. Optical sound record comprising
   a film strip carrying at an elongated sound track area at least two light selective media which produce respective optical densities predominantly limited to distinct regions of the photographic spectrum,
   each of said densities being essentially uniform transversely of the track area, and
   said densities of the respective two media being modulated longitudinally of the track area in mutually inverse phase relation in accordance with a common sound signal,
   the corresponding inverse density variations of said two media being mutually superposed.

2. Sound record according to claim 1 wherein
   said strip carries a third medium which produces optical densities predominantly limited to a third region of the photographic spectrum,
   said third medium having density variations which represent variations in the ratio between the amplitude of said density variations of the first said two media and the sound amplitudes represented thereby.

3. Apparatus for producing an electrical sound signal from a sound record according to claim 2 comprising
   means for optically scanning said track area and for deriving an electrical difference signal and an electrical sum signal which vary, respectively, with the difference and the sum of said densities of the first said two media,
   means for producing an electrical dynamic signal which varies with the density of said third medium,
   means for correcting the dynamic signal in response to said sum signal,
   and means for variably amplifying the difference signal under control of the corrected dynamic signal.

4. Apparatus for producing an electrical sound signal from a sound record according to claim 1, comprising
   means for optically scanning said track area and for deriving an electrical difference signal which varies with the difference of said densities, and an electrical sum signal which varies with the sum of said densities,
   means responsive to said sum signal for deriving an error signal which represents deviations of said difference signal due to occlusions of both polarities anywhere within said track area, and means for variably amplifying the difference signal with a gain that varies in response to said error signal.

5. Apparatus according to claim 4 wherein
   said error signal deriving means comprise means for rectifying the sound frequency variations of said sum signal, and
   the gain of said amplifying means varies directly with the rectified signal.

6. Apparatus according to claim 5 including means for isolating the amplifying means from components of said sum signal variations that correspond to a frequency region lower than sound frequencies.

7. Optical sound record comprising
   a film strip carrying at an elongated sound track area at least two light selective media which produce respective optical densities predominantly limited to distinct regions of the photographic spectrum,
   said densities having longitudinal variations which form the two components of a push-pull representation of a common sound signal the density variations which form one component occupying substantially the same strip area as the corresponding density variations which form the other component.

8. Sound record according to claim 7 wherein
said strip carries a third medium which produces at said track area effective optical densities predominantly limited to a third region of the photographic spectrum,
the densities of said third medium having longitudinal variations which represent a second signal.

9. Apparatus for reproducing said sound signal and said second signal from a sound record according to claim 8 comprising
means for optically scanning said record and for deriving an electrical difference signal and an electrical sum signal which vary, respectively, with the difference and the sum of said densities of the first said two media, the difference signal reproducing said sound signal,
said scanning means including means for producing a further electrical signal which varies with the density of said third medium,
and means for correcting said further signal under control of said sum signal to reproduce said second signal.

10. Sound record according to claim 8,
said density variations of the third medium forming a first component of a push-pull representation of said second signal,
said two media producing respective further density variations which have substantially equal magnitude and like phase and which jointly form the second component of said push-pull representation of the second signal, the corresponding density variations that represent the second signal being mutually superposed.

11. Sound record according to claim 6 wherein
all said density variations are so limited as to avoid exceeding the modulation capability of the first said two media.

12. Sound record according to claim 7 including also
density variations produced respectively by said two media at a second track area offset laterally from the first said track area and forming the two components of a second push-pull representation of said sound signal,
the corresponding components of said two representations being formed by density variations of opposite media.

13. Apparatus for producing an electrical sound signal from a sound record according to claim 12 comprising
means for optically scanning each of said track areas and for deriving a first difference signal which varies with the difference of the first said density variations, and for deriving a second difference signal which varies with the difference of said offset density variations,
and output means responsive to the difference of said difference signals.

14. Sound record according to claim 12 wherein one of said media produces red densities and the other said medium includes two medium portions which produce respective green and blue densities having like density variations.

15. Sound record according to claim 7 wherein one of said media produces red densities and the other said medium includes two medium portions which produce respective green and blue densities having like density variations.

16. Apparatus for recording a sound signal, comprising
means for scanning a photographic color film with a light image of slit form having a normal hue and intensity to expose the film,
and means for modulating the hue of the light image in accordance with said sound signal without corresponding intensity variation.

17. Apparatus according to claim 16 wherein said scanning means comprise
means for producing two light sources of slit form predominantly limited to respective regions of the photographic spectrum,
and means for optically imaging the light sources in superposition on a relatively moving film,
and said modulating means comprise
means for modulating the effective intensities of the respective light sources in mutually inverse phase relation in accordance with said sound signal.

18. Apparatus according to claim 17 wherein said source producing means comprise cathode ray tube means with electron beam deflection means for forming light configurations of slit form.

19. Apparatus according to claim 17 wherein said source producing means comprise
a cathode ray tube,
means for sweeping an electron beam alternately along a plurality of generally parallel paths on the tube screen,
and means for causing the light from said paths to correspond to said respective spectral regions,
said modulating means including means for varying the beam intensity in accordance with said sound signal and for switching the polarity of such intensity variation in synchronism with said alternation of paths.

20. Optical sound record comprising
a film strip carrying at an elongated sound track area at least three light selective media which produce effective optical densities predominantly limited to respective regions of the photographic spectrum,
the densities of said three media having such longitudinal variations that a scanning light beam is wavelength modulated on two distinct hue axes in accordance with respective sound signals without corresponding intensity variation.

21. Sound record according to claim 20 wherein the signal modulated on one of said axes represents the sum of the sound amplitudes of two sound channels, and the signal modulated on another of said axes represents the difference of the sound amplitudes of two channels.

22. Apparatus for producing a sound record according to claim 21 comprising
means for producing first, second and third light sources of slit form predominantly limited to respective regions of the photographic spectrum, said first and second spectral regions defining said one hue axis, and said third spectral region and a combination of said first and second spectral regions defining said other hue axis,
means for inversely modulating the effective intensities of said first and second light sources in accordance with the sum of the sound amplitudes of the respective two channels to modulate said amplitude sum on said one hue axis, means for further modulating the effective intensities of said first and second light sources in like polarity and for modulating the effective intensity of said third light source in the opposite polarity in accordance with the difference of the sound amplitudes of the respective two channels to modulate said amplitude difference on said other hue axis, and means for optically imaging the three light sources in superposition on a relatively moving color film to expose the film.

23. Apparatus for producing from a sound record according to claim 21 two electrical sound signals corresponding to the respective sound channels, comprising means for optically scanning the track area and for deriving three electrical signals corresponding to the longitudinal density variations of the respective three media, means for deriving from said electrical signals two electrical difference signals corresponding to said wavelength modulations on the respective hue axes, and means for deriving the sum of said difference signals to produce one sound signal and for deriving the difference of said difference signalls to produce the other sound signal.

24. Apparatus for producing from a sound record according to claim 21 a monophonic sound signal corresponding to a combination of said two channels, comprising means for optically scanning the track area and for deriving two electrical signals corresponding to the longitudinal density variations of two wavelength regions that are spaced along said one hue axis, and means for deriving the difference of said two signals to produce said monophonic sound signal.

25. Sound record according to claim 20 wherein the signal modulated on one of said axes represents the sound amplitude of one sound channel, and the signal modulated on another of said axes represents the sound amplitude of another sound channel.

26. Apparatus for producing a sound record according to claim 25 comprising means for producing first, second and third light sources of slit form predominantly limited to respective regions of the photographic spectrum, said first and second spectral regions defining said one hue axis, and said third spectral region and a combination of said first and second spectral regions defining said other hue axis, means for inversely modulating the effective intensities of said first and second light sources in accordance with the sound amplitudes of said one channel, means for further modulating the effective intensities of said first and second light sources in like polarity and for modulating the effective intensity of said third light source in opposite polarity in accordance with the sound amplitudes of said other channel, and means for optically imaging the three light sources in superposition on a relatively moving color film to expose the film.

27. Apparatus for producing from a sound record according to claim 25 two electrical sound signals corresponding to the respective sound channels, comprising means for optically scanning the track area and for deriving three electrical signals corresponding to the longitudinal density variations of the respective three media, and means for deriving from said electrical signals two difference signals corresponding to said wavelength modulations on the respective hue axes to produce said sound signals.

28. Apparatus for reproducing sound signals of a plurality of sound channels which are recorded in respective laterally adjacent sections of a sound track area of a color motion picture film, each signal record comprising a plurality of optical densities predominantly limited to respective spectral regions, said apparatus comprising means for transporting the film at uniform speed, scanning means for projecting a light beam to illuminate a narrow slit area extending across the sound track area of the transported film, optical means for dispersing transversely of the slit length light of said beam transmitted by the sound track and for imaging the slit area at an image surface to form a spectrum, transducer means mounted at the image surface and comprising a two-dimensional array of electrically mutually isolated photoresponsive areas of said image surface shaped and positioned to receive selectively light of the respective and track sections and spectral regions, and circuit means connected to the photoresponsive areas for producing electrical signals corresponding to the recorded sound signals of the plurality of channels.

29. Apparatus according to claim 18 wherein the photoresponsive surface areas of said array are formed in a surface of a unitary semiconductive element.

30. Apparatus according to claim 28 wherein said film transport means and said scanning means comprise portions of the sound reproducing equipment of a motion picture projector originally designed to project film having a single channel silver sound track, said projector including a photosensor carried by a removable bracket within the periphery of a film transport drum for receiving infrared light transmitted radially inwardly by the illuminated area of the silver sound track, said apparatus including bracket means carrying said optical means and said transducer means and mountable on said projector after removal of said bracket.

31. Apparatus according to claim 30 wherein said array of photoresponsive areas includes also a photoresponsive area in position to receive infrared light dispersed by said optical means from a single channel silver sound track of a transported motion picture film, and said circuit means include switchable means connected to said further photoresponsive area for producing an electrical signal corresponding to said single channel.

32. Method of recording sound on a color film, comprising producing a configuration of light of narrow slit form having a wavelength distribution which is uniform longitudinally of the slit and normally corresponds to a reference spectral hue, causing the hue of the wavelength distribution to vary along a hue axis in accordance with the instantaneous sound amplitude without corresponding intensity variation, and recording the hue variations of the light configuration on the color film.

33. Method according to claim 32 including producing and optically combining a plurality of light beams predominantly limited to respective regions of the photographic spectrum to produce said wavelength distribution, and varying the intensities of at least two of the light beams in opposite polarity and with corresponding amplitudes to produce said hue variations.

34. Method according to claim 33 including sweeping a cathode ray tube beam along a plurality of parallel linear tracks on the tube screen to produce the respective said light beams.

* * * * *